United States Patent
Lee et al.

(10) Patent No.: US 9,877,353 B2
(45) Date of Patent: Jan. 23, 2018

(54) APPARATUS AND METHOD FOR AUTO LINK CHANGE IN WIRELESS COMMUNICATION DEVICE

(71) Applicant: Samsung Electronics Co., Ltd., Gyeonggi-do (KR)

(72) Inventors: Tae-Young Lee, Seoul (KR); Jae-Eun Kang, Gyeonggi-do (KR); Han-Su Kang, Seoul (KR); Sung-Il Park, Gyeonggi-do (KR); Seong-Hee Park, Seoul (KR); Bong-Jhin Shin, Gyeonggi-do (KR); Chil-Youl Yang, Gyeonggi-do (KR); Myoung-Hwan Lee, Gyeonggi-do (KR); Jang-Hee Lee, Gyeonggi-do (KR); Chun-Ho Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/707,698

(22) Filed: May 8, 2015

(65) Prior Publication Data
US 2015/0327138 A1    Nov. 12, 2015

(30) Foreign Application Priority Data
May 9, 2014    (KR) .......................... 10-2014-0055616

(51) Int. Cl.
*H04W 76/04*    (2009.01)
*H04W 4/00*    (2009.01)
(Continued)

(52) U.S. Cl.
CPC .......... *H04W 76/064* (2013.01); *H04W 4/005* (2013.01); *H04W 4/008* (2013.01);
(Continued)

(58) Field of Classification Search
CPC ... H04W 36/14; H04W 76/064; H04W 84/18; H04W 84/12; H04W 76/025;
(Continued)

(56) References Cited

U.S. PATENT DOCUMENTS

| 7,469,125 | B2 * | 12/2008 | Nurmi | H04W 88/02 |
|---|---|---|---|---|
| | | | | 370/310 |
| 8,706,037 | B1 * | 4/2014 | Hamilton | H04W 76/023 |
| | | | | 455/41.1 |

(Continued)

FOREIGN PATENT DOCUMENTS

WO    WO 2013/169823    11/2013

OTHER PUBLICATIONS

European Search Report dated Sep. 17, 2015 issued in counterpart application No. 15167070.0-1854, 11 pages.

*Primary Examiner* — Sharad Rampuria
(74) *Attorney, Agent, or Firm* — The Farrell Law Firm, P.C.

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services. An electronic device for and a method of performing wireless communication are provided. The electronic device includes a first module configured to transmit signals to another electronic device via a first type of link; a second module configured to transmit signals to the another electronic device via a second type of link; and a controller configured to establish the first type of link and release from the second type of link if a predetermined event occurs.

22 Claims, 26 Drawing Sheets

(51) Int. Cl.
*H04W 36/14* (2009.01)
*H04W 76/06* (2009.01)
*H04W 92/18* (2009.01)
*H04W 36/36* (2009.01)
*H04W 36/18* (2009.01)
*H04W 88/06* (2009.01)
*H04W 76/02* (2009.01)
*H04W 84/12* (2009.01)
*H04W 84/18* (2009.01)
*H04W 36/00* (2009.01)

(52) U.S. Cl.
CPC ........ *H04W 36/0027* (2013.01); *H04W 36/14* (2013.01); *H04W 36/18* (2013.01); *H04W 36/36* (2013.01); *H04W 76/025* (2013.01); *H04W 84/12* (2013.01); *H04W 84/18* (2013.01); *H04W 88/06* (2013.01); *H04W 92/18* (2013.01)

(58) Field of Classification Search
CPC ..... H04W 4/008; H04W 88/06; H04W 4/005; H04W 36/36; H04W 36/18; H04W 92/18; H04W 36/0027; H04W 76/02; H04W 8/005; H04W 68/00; H04W 88/02; H04W 92/02; G06K 19/0723; G06K 7/0008; H04B 5/00; H04B 5/0012; H04B 5/02; H04M 1/7253; H04M 2250/02; H04R 2420/07
USPC .............................. 455/436–444, 41.2, 552.1
See application file for complete search history.

(56) References Cited

U.S. PATENT DOCUMENTS

| | | | |
|---|---|---|---|
| 2005/0226195 A1* | 10/2005 | Paris | H04L 1/16 370/338 |
| 2005/0239497 A1 | 10/2005 | Bahl et al. | |
| 2008/0002612 A1 | 1/2008 | Haumont | |
| 2008/0096560 A1 | 4/2008 | Felske et al. | |
| 2008/0254745 A1* | 10/2008 | Zhang | H04W 16/14 455/41.2 |
| 2009/0111378 A1* | 4/2009 | Sheynman | H04W 8/005 455/41.1 |
| 2009/0215398 A1* | 8/2009 | Adler | H04L 63/08 455/41.3 |
| 2011/0059768 A1* | 3/2011 | Pandruvada | H04W 88/06 455/552.1 |
| 2011/0275316 A1* | 11/2011 | Suumaki | G06K 7/10237 455/41.1 |
| 2011/0317660 A1 | 12/2011 | Jin | |
| 2013/0036231 A1* | 2/2013 | Suumaki | H04L 63/18 709/228 |
| 2013/0095753 A1* | 4/2013 | Chen | H04B 5/00 455/41.1 |
| 2013/0229976 A1 | 9/2013 | Srinivasan et al. | |
| 2014/0031044 A1 | 1/2014 | Mozzarella | |
| 2014/0141714 A1* | 5/2014 | Ghosh | H04L 29/08 455/39 |
| 2014/0211705 A1* | 7/2014 | Baek | H04W 76/023 370/329 |

* cited by examiner

APPARATUS AND METHOD FOR AUTO LINK CHANGE IN WIRELESS COMMUNICATION DEVICE

PRIORITY

This application claims priority under 35 U.S.C. § 119(a) to a Korean Patent Application filed on May 9, 2014 in the Korean Intellectual Property Office and assigned Serial No. 10-2014-0055616, the contents of which are incorporated herein by reference.

BACKGROUND

1. Field of the Invention

The present invention relates generally to an apparatus and method for automatically changing a link in a communication among terminals in a wireless communication system, and more particularly, to an apparatus and method for handover between terminals supporting Bluetooth.

2. Description of the Related Art

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In recent years, portable terminals are increasingly being used because they are easy to carry. As portable terminals are increasingly used, service providers (e.g. terminal manufacturers) are developing more convenient additional functions to attract more customers. The Bluetooth function is one of the additional functions in development that enables terminals existing within a short distance to communicate with one another. Recent portable terminals provide various services such as music through a headset, printing, sending files, or the like using the Bluetooth function.

The Bluetooth technology refers to technical standards defined by a nonprofit organization, called "BLUETOOTH SPECIAL INTEREST GROUP (SIG)," to provide a low-price short-distance wireless connection for data and voice using 2.4 GHz, and is based on the Institute for Electrical and Electronics Engineers (IEEE) 802.11 standards. Bluetooth is able to form a network by overlapping a plurality of independent piconets in the same space, and thus can be applied to a place where information processing and communication devices are overcrowded. In addition, Bluetooth is equipped with a transfer error correcting function, an identifying function, a password function, and a power-saving function.

However, if a Bluetooth device connects to a host device, but moves away from the host device, the Bluetooth device is unable to communicate with the host device due to its limited coverage. In addition, the Bluetooth device may not support a service requiring high-speed data transfer, such as a moving image, due to its limited function, and does not prepare in advance for handover between connecting media and thus may frequently suffer from disconnection since the handover is performed after the service is terminated. In addition, if handover is performed from Bluetooth to Wireless Fidelity (Wi-Fi), an existing Bluetooth link is canceled and a new Wi-Fi link is established. Therefore, the existing functions related to Bluetooth should be modified.

Therefore, there is a need for an apparatus and method for stabilizing a process of connecting a Bluetooth device.

SUMMARY

The present invention has been made to address the above-mentioned deficiencies and disadvantages, and to provide an apparatus and method for managing a connection between terminals.

Accordingly, an aspect of the present invention is to provide an apparatus and method for enabling handover to another network in a state in which a terminal maintains a service.

Another aspect of the present invention is to provide a service user environment in which a terminal enables handover to another network before disconnecting from an existing network, and thus avoids an abrupt disconnection.

In accordance with an aspect of the present invention, an electronic device for performing wireless communication is provided. The electronic device includes a first module configured to transmit signals to another electronic device via a first type of link; a second module configured to transmit signals to the another electronic device via a second type of link; and a controller configured to establish the first type of link and release from the second type of link if a predetermined event occurs.

In accordance with another aspect of the present invention, a method of performing wireless communication in an electronic device is provided. The method includes communicating, by a first module, with another electronic device via a first type of link; communicating, by a second module, with the another electronic device via a second type of link; and, if a predetermined event occurs, establishing the first type of link and releasing from the second type of link.

According to another aspect of the present invention, a handover method which provides a service without disconnecting a terminal and a host device if the terminal and the host device connect to each other is provided.

According to another aspect of the present invention, a communication coverage and a transfer rate of a terminal is changed to another network if necessary, so that the terminal can maintain communication with a host device and support various services.

BRIEF DESCRIPTION OF THE DRAWINGS

The above and other aspects, features, and advantages of the present invention will be more apparent the following description, taken in conjunction with the accompanying drawings, in which.

DETAILED DESCRIPTION OF EMBODIMENT OF THE PRESENT INVENTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions or configurations may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents. It is to be understood that the singular forms "a," "an," and "the" include plural referents unless the context clearly dictates otherwise. Thus, for example, reference to "a component surface" includes reference to one or more of such surfaces.

Figure 1:
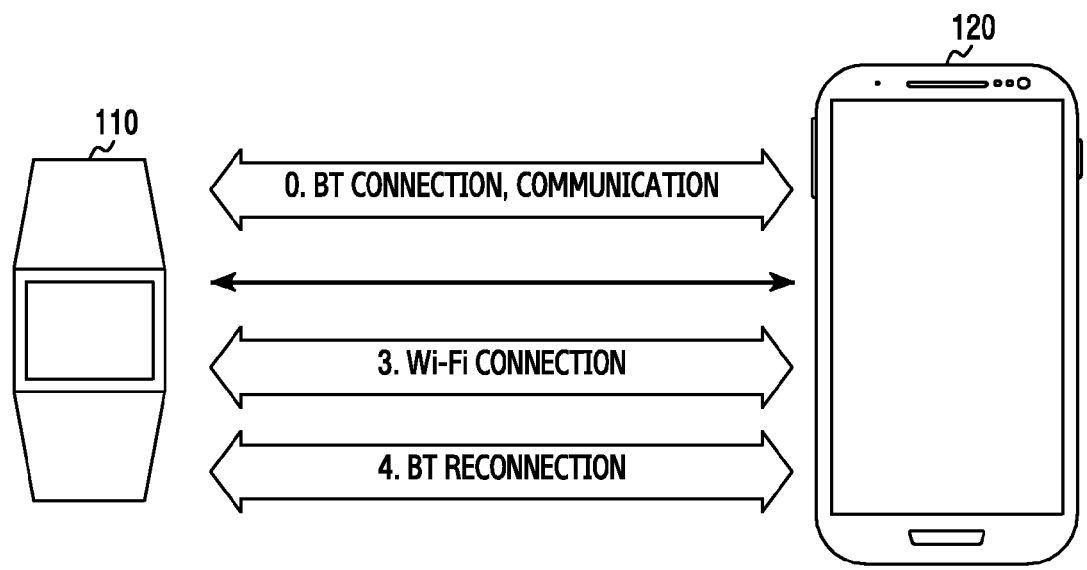
FIG. 1 illustrates a connection between a terminal and a host device according to an embodiment of the present invention.

FIG. 1 illustrates a connection between a terminal and a host device according to an embodiment of the present invention.

Referring to FIG. 1, the terminal 110 connects to the host device 120 and transmits and receives information to and from the host device 120. The terminal 110 connects to the host device in various ways, such as Bluetooth, Wi-Fi, or a cellular network (e.g. 3G/4G). In addition, the terminal 110 and the host device 120 each include a device which is able to communicate, such as a Bluetooth device, a Personal Computer (PC), a laptop, a cellular phone, and the like. The terminal 110 in the present invention connects to the host device 120 via a Bluetooth network, and, if a certain event occurs, the terminal 110 performs handover to a Wi-Fi network. The certain event includes an event which is generated by bandwidth information, a distance, a service type, a link loss, and interference between the terminal 110 and the host device 120. The terminal 110 may reconnect to the Bluetooth network if the event is terminated.

Figure 2:
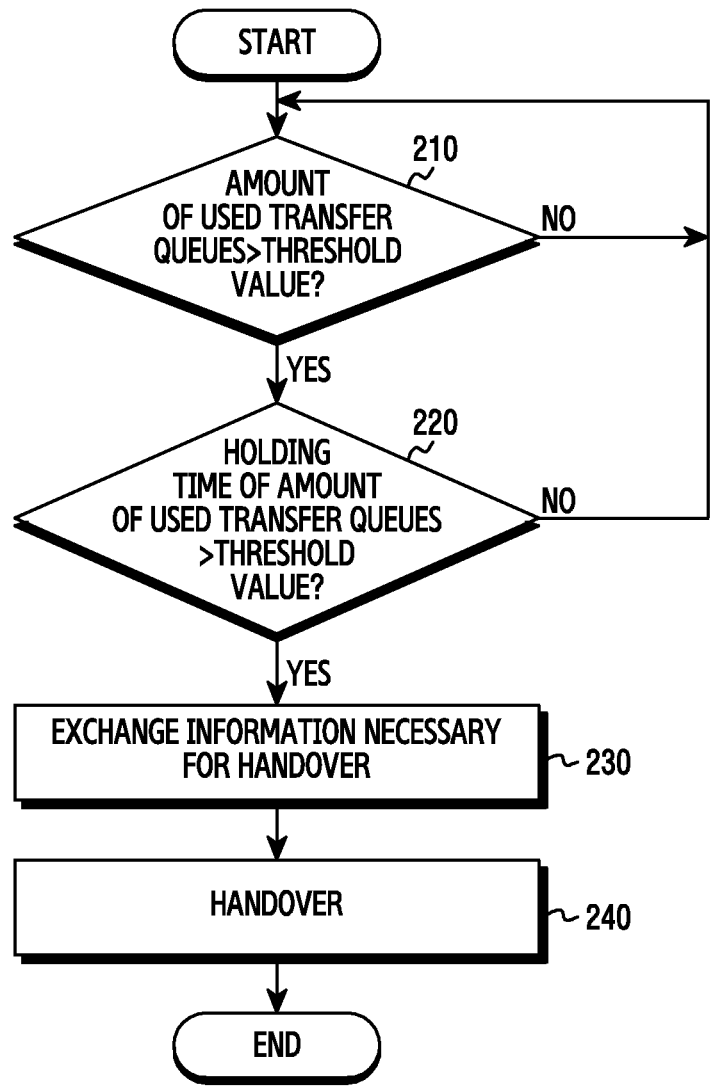
FIG. 2 is a flowchart of a handover method according to an amount of used transfer queues during a bandwidth searching process according to an embodiment of the present invention.

FIG. 2 is a flowchart of a handover method according to an amount of used transfer queues during a bandwidth searching process according to an embodiment of the present invention.

Referring to FIG. 2, in step 201, the terminal compares the amount of used transfer queues and a threshold value. If the terminal uses a short-distance communication service including the Bluetooth network, and is required to process a large amount of data in communicating with the host device, the terminal may spend much time communicating with the host device or may not be able to transfer the data. Therefore, the terminal measures transfer queues and determines whether the amount of the transfer queues is greater than a predetermined threshold value in step 210.

In step 220, the terminal compares a transfer queue holding time indicating how long the amount of used transfer queues is held, and a threshold value. If the amount of used transfer queues is held for more than a predetermined threshold time, the terminal determines that transfer queues more than a predetermined number are used. The transfer queue holding time are set to prevent frequent handover caused by irregular transfer queues and achieve more reliable handover.

In step 230, the terminal exchanges information necessary for handover. The information necessary for the handover refers to information on a network to which connectivity is handed over in addition to a currently connected network. The network to which connectivity is handed over may include Bluetooth, Wi-Fi, a Global System for Mobile Communication (GSM) network, an Enhanced Data GSM Environment (EDGE) network, a Code Division Multiple Access (CDMA) network, a Wideband Code Division Multiple Access (W-CDMA) network, a Long Term Evolution (LTE) network, an Orthogonal Frequency Division Multiple Access (OFDMA) network, and the like.

In step 240, the terminal performs handover. The terminal compares the amount of used transfer queues and the transfer queue holding time and threshold values, and, if the amount of used transfer queues and the transfer queue holding time are greater than the threshold values, performs handover. If the handover is performed, the terminal disconnects from the existing network and connects to the host device via the network to which connectivity is handed over.

Figure 3:
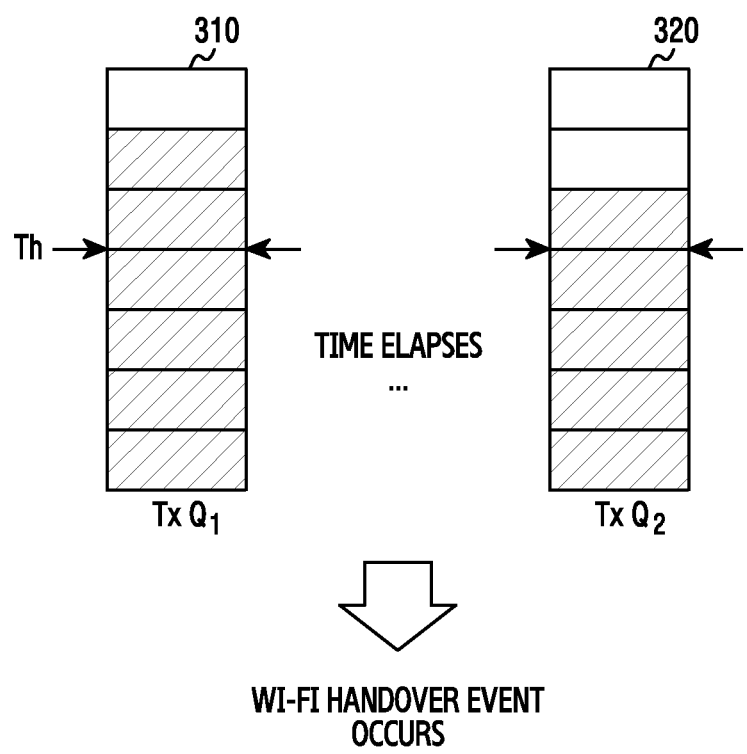
FIG. 3 illustrates a handover event which occurs based on an identified amount of used transfer queues according to an embodiment of the present invention.

FIG. 3 illustrates a view showing an example of a handover event which occurs based on an identified amount of used transfer queues according to an embodiment of the present invention.

Referring to FIG. 3, if transfer queues greater than a predetermined threshold value are identified during a certain time, that is, during TX Q1 310 and TX Q2 320, a transfer queue-based handover event may occur.

Figure 4:
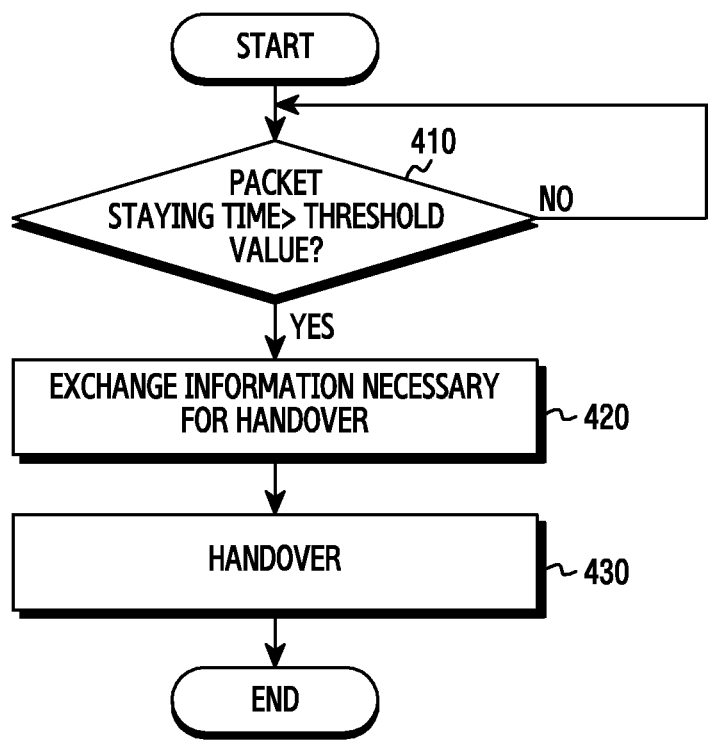
FIG. 4 is a flowchart of a handover method according to a packet staying time according to an embodiment of the present invention.

FIG. 4 is a flowchart of a handover method according to a packet staying time according to an embodiment of the present invention.

In step 410, the terminal identifies a time during which a packet stays in a transfer queue. The terminal compares the time during which the packet stays in the transfer queue and a predetermined threshold value, and, if the time during which the packet stays in the transfer queue is greater than the predetermined threshold value, the terminal uses a short-distance communication service including the Bluetooth network, and if the terminal has much data to process in communicating with the host device, the terminal may spend much time communicating with the host device or may be unable to transfer data. Therefore, the terminal measures the packet staying time and determines whether the packet staying time is greater than the predetermined threshold value or not in step 410.

In step 420, the terminal exchanges information necessary for handover. The information necessary for the handover refers to information on a network to which connectivity is handed over in addition to a currently connected network. The network to which connectivity is handed over may include Bluetooth, Wi-Fi, a GSM network, an EDGE network, a CDMA network, a W-CDMA network, an LTE network, an OFDMA network, and the like.

In step 430, the terminal performs handover. The terminal compares the packing staying time and the threshold value, and, if the packet staying time is greater than the threshold value, performs the handover. If the handover is performed, the terminal disconnects from the existing network and connects to the host device via the network to which connectivity is handed over.

Figure 5:
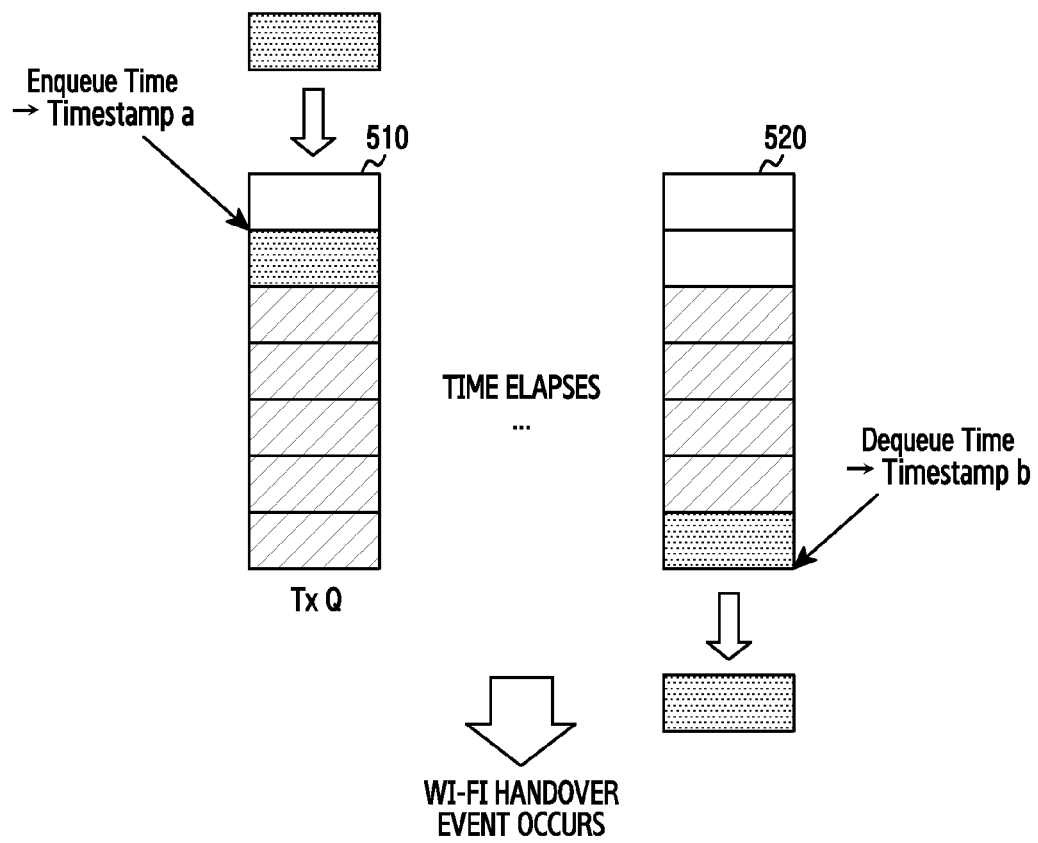
FIG. 5 illustrates a handover event which occurs based on a packet transfer queue staying time according to an embodiment of the present invention.

FIG. 5 illustrates a view showing an example of a handover event which occurs based on a packet transfer queue staying time according to an embodiment of the present invention.

Referring to FIG. 5, a time between a time if the packet is described in the transfer queue first, that is, "enqueue time" 510, and a time if the packet disappears from the queue, that is, "dequeue time" 520, that is, a difference between the enqueue time and the dequeue time is measured, and if the difference is greater than a predetermined threshold value, the transfer queue staying time-based handover event occurs.

Figure 6:
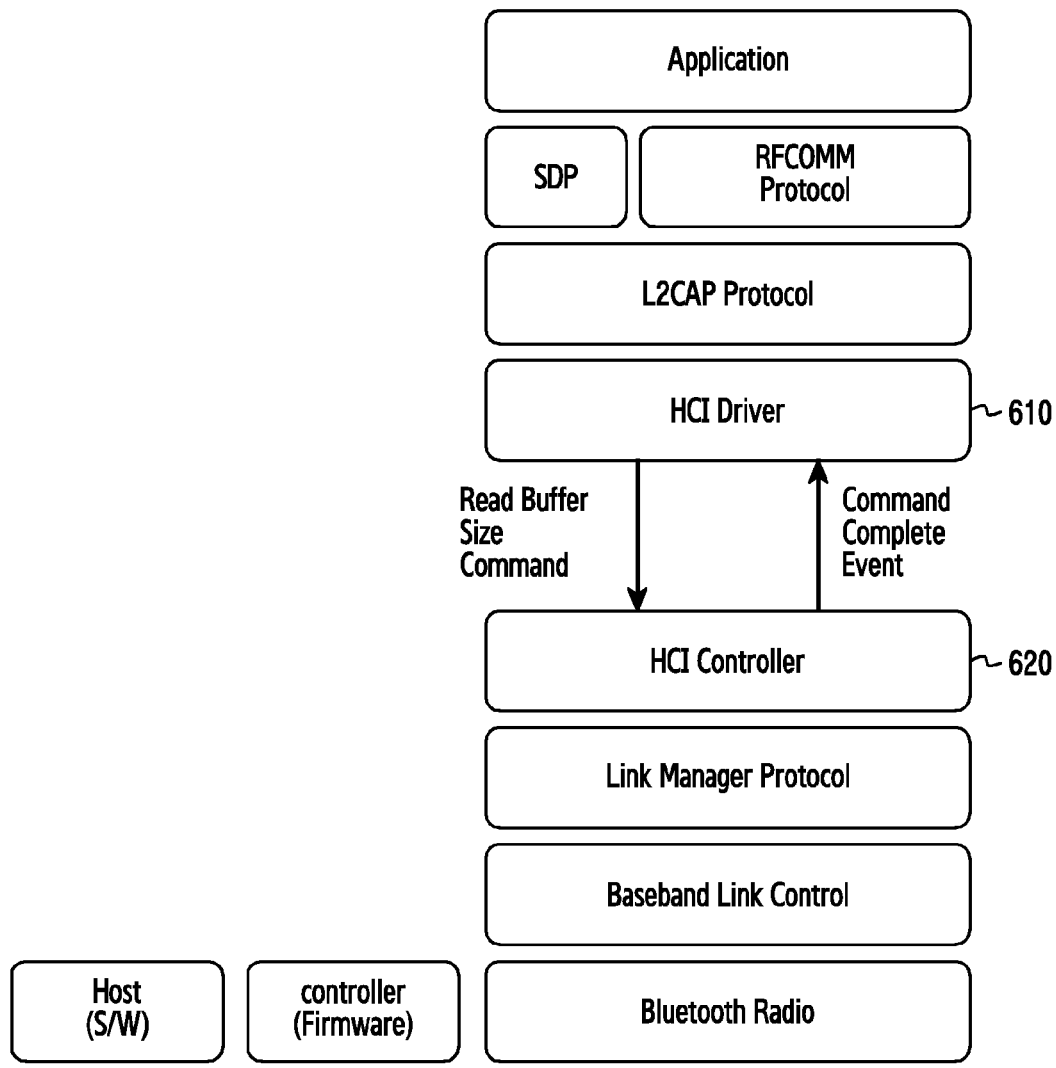
FIG. 6 illustrates a process for identifying an amount of a used transfer buffer using a Host Controller Interface (HCI) command according to an embodiment of the present invention.

FIG. 6 illustrates a view showing an example of a process for identifying an amount of a used transfer buffer using an HCI command according to an embodiment of the present invention.

The current amount of the used transfer buffer may be identified using an HCI command of the specification BT core v4.0. If the host device transmits a read buffer size command to the terminal, the terminal transmits a return parameter to the host device. The return parameter includes HC_TotalNum_ACL_DataPackets and HC_Total_Num_Synchronous_Data_Packets. HC_Total_Num_ACL_Data_Packets indicates the number of packets that the host sends to a controller in a Control List (CL) link, and the amount of a used transfer buffer in a current CL link may be inferred based on HC_Total_Num_ACL_DataPackets. HC_ Total_ Num_ Synchronous_Data_Packets indicates the number of packets that the host device sends to a controller in a Synchronous Connection Oriented (SCO) link, and the amount of a used transfer buffer in a current SCO link may be inferred based on HC_Total_Num_Synchronous_Data_Packets. The specification BT core v4.0, HC_Total_Num_ACL_DataPackets, and HC_Total_Num_Synchronous_Data_Packets are described in Tables 1, 2, and 3 presented below, respectively:

TABLE 1

| Command | OCF | Command Parameters | Return Parameters |
|---|---|---|---|
| HCI_Read_Buffer_Size | 0x0005 | | Status, HC_ACL_Data_Packet_Length, HC_Synchronous_Data_Packet_Length, HC_Total_Num_Acl_Data_Packets, HC_Total_Num_Synchronous_Data_Packets |

TABLE 2

| Value | Parameter Description |
| --- | --- |
| 0xXXXX | Total number of HCI ACL Data Packets that can be stored in the data buffers of the Controller |

TABLE 3

| Value | Parameter Description |
| --- | --- |
| 0xXXXX | Total number of HCI Synchronous Data Packets that can be stored in the data buffers of the Controller |

Figure 7:
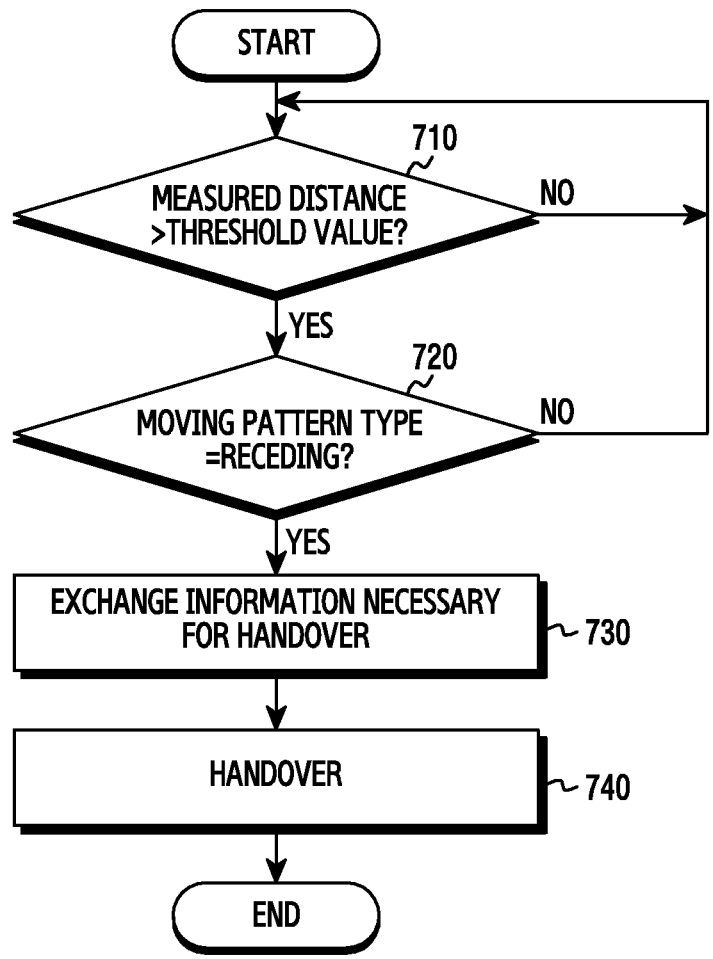
FIG. 7 is a flowchart of a handover method according to a moving pattern according to an embodiment of the present invention.

FIG. 7 is a flowchart of a handover method according to a moving pattern according to an embodiment of the present invention.

Referring to FIG. 7, in step 710, the terminal measures a distance to the host device. If the terminal determines that the distance between the terminal and the host device is greater than a predetermined threshold value, the terminal identifies a moving pattern in step 720.

The moving pattern identified in step 720 is divided into an approaching pattern in which the terminal moves closer to the host device, a staying pattern in which the distance between the terminal and the host device is not changed, and a receding pattern in which the terminal moves away from the host device. The terminal identifies the moving pattern in step 720, and, if the terminal moves away from the host device, that is, if the moving pattern is the receding pattern, the terminal determines that the terminal will be disconnected from the host device after a predetermined time. The moving pattern may be identified based on RSSI signals. That is, if the strength of signals becomes low, it may be determined that the terminal moves away from the host device.

If the terminal moves away from the host device, and thus determines that the terminal will be disconnected, the terminal exchanges information necessary for handover in step 730. The information necessary for the handover refers to information on a network to which connectivity is handed over in addition to a currently connected network. The network to which connectivity is handed over may include Bluetooth, Wi-Fi, a GSM network, an EDGE network, a CDMA network, a W-CDMA network, an LTE network, an OFDM network, and the like.

In step 740, the terminal performs handover. The terminal identifies the moving pattern, and, if it is determined that the terminal moves away from the host device, performs the handover. If the handover is performed the terminal disconnects from the existing network and connects to the host device via the network to which connectivity is handed over.

Figure 8:
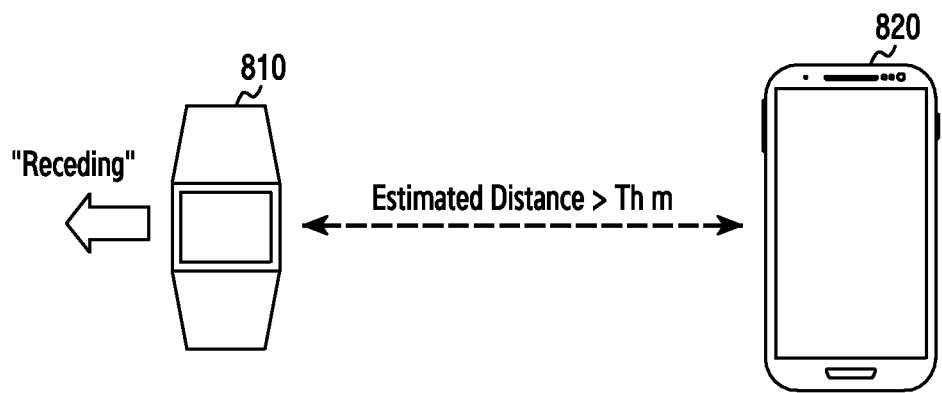
FIG. 8 illustrates a handover event which occurs according to a measured distance according to an embodiment of the present invention.

FIG. 8 illustrates a handover event which occurs according to a measured distance according to an embodiment of the present invention.

Referring to FIG. 8, a terminal 810 measures a distance to a host device 820, and, if the distance is greater than a threshold value, identifies a moving pattern. If it is determined that the terminal 810 will move further away from the host device 820, the terminal 810 performs handover to prevent disconnection from the host device 820.

Figure 9:
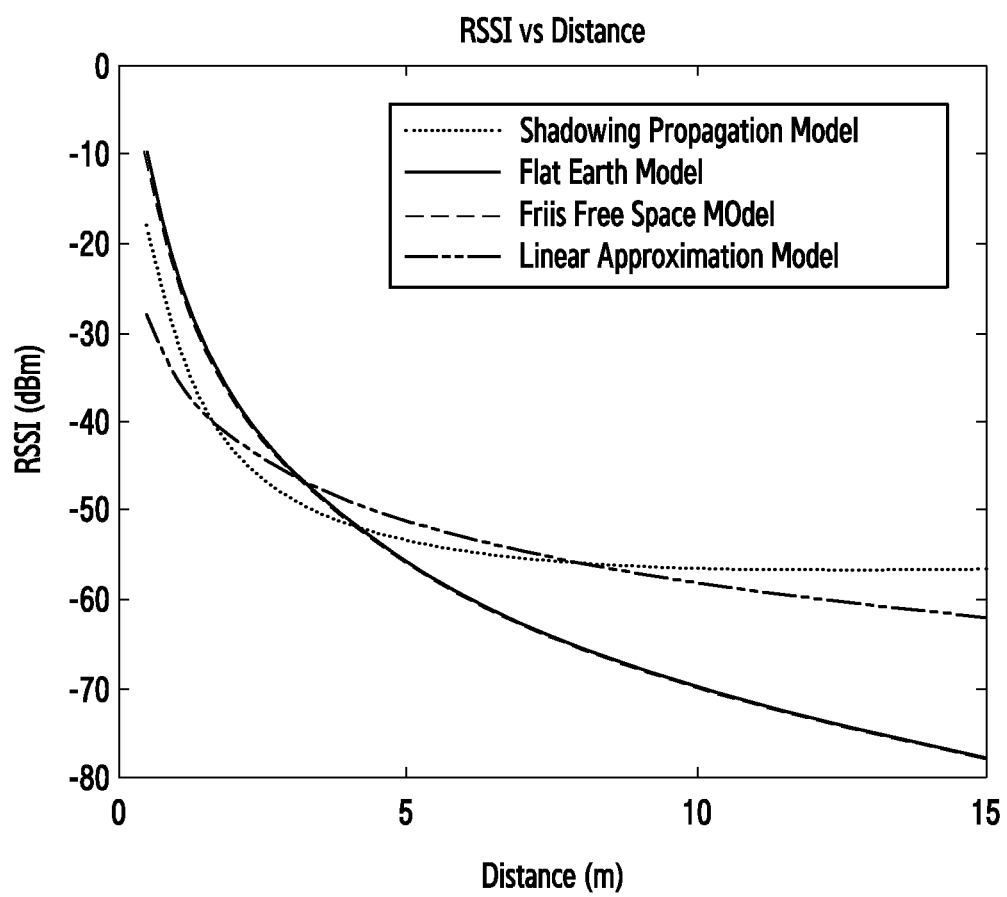
FIG. 9 is a graph of a change in a Received Signal Strength Indication (RSSI) value according to a distance according to an embodiment of the present invention.

FIG. 9 is a graph showing an example of a change in an RSSI value according to a distance according to an embodiment of the present invention.

Referring to FIG. 9, a horizontal axis indicates a distance and a vertical axis indicates strength of an RSSI signal. As the distance increases, the strength of the RSSI signal decreases. The terminal receives the RSSI signal and estimates a distance according to the RSSI signal.

Figure 10:
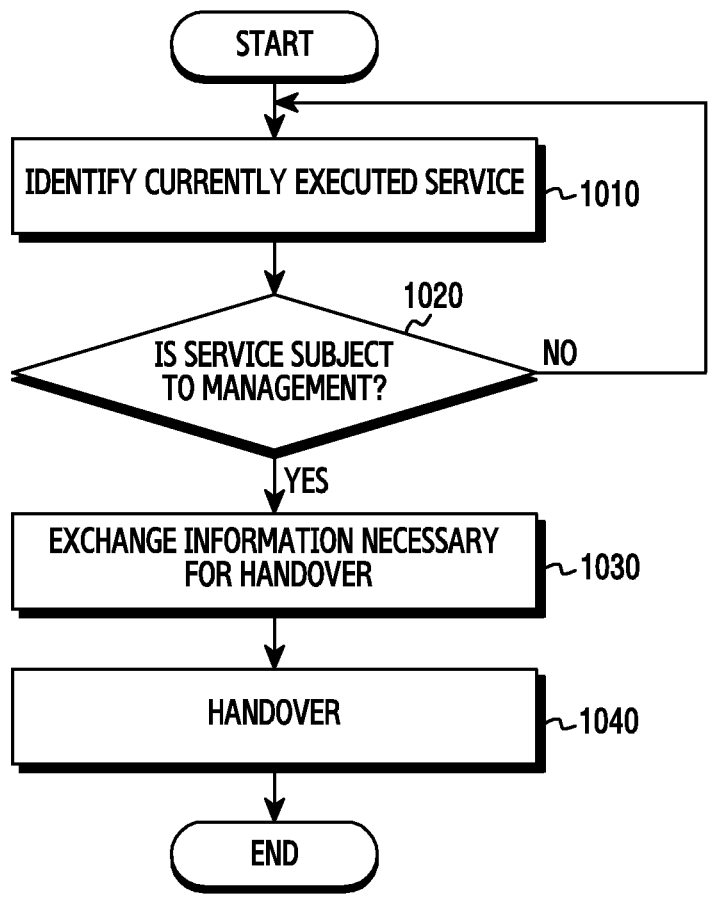
FIG. 10 is a flowchart of a handover method according to an identified service according to an embodiment of the present invention.

FIG. 10 is a flowchart of a handover method according to an identified service according to an embodiment of the present invention.

Referring to FIG. 10, in step 1010, the terminal identifies a currently executed service. The terminal may require a high-speed or high-capacity service according to the characteristic of the service. However, if the service is executed via a short-distance network such as the Bluetooth network, the high-speed or high-capacity service cannot be supported or may not be smoothly executed. Therefore, handover to a network in which the high-speed or high-capacity service can be supported is required to support the service.

In step 1020, the terminal determines whether the currently executed service is subject to management. The service subject to management may be set by the user or a service provider. If the current service is a high-speed or high-capacity service, the service is set to be subject to management.

If the terminal determines that the service is subject to management, the terminal exchanges information necessary for handover in step 1030. The information necessary for the handover refers to information on a network to which connectivity is handed over in addition to a currently connected network. The network to which connectivity is handed over may include Bluetooth, Wi-Fi, a GSM network, an EDGE network, a CDMA network, a W-CDMA network, an LTE network, an OFDM network, and the like.

The terminal performs handover in step 1040. The terminal determines handover if it is determined that the service is subject to management. If the handover is performed, the terminal disconnects from the existing network and connects to the host device via the network to which connectivity is handed over.

Figure 11:
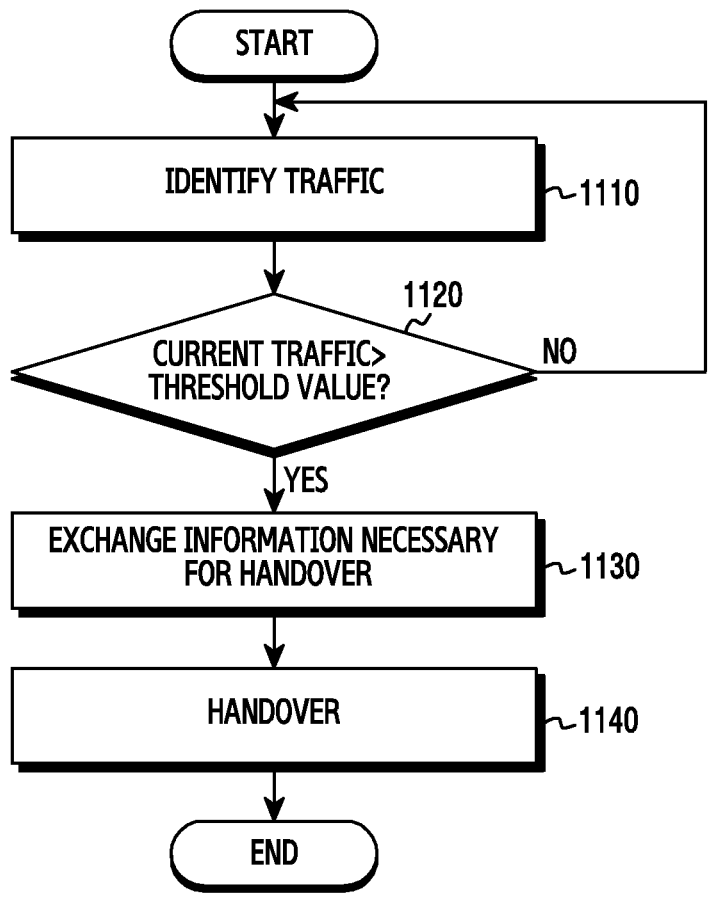
FIG. 11 is a flowchart of a handover method according to identified traffic according to an embodiment of the present invention.

FIG. 11 is a flowchart of a handover method according to identified traffic according to an embodiment of the present invention.

Referring to FIG. 11, the terminal identifies traffic in step 1110. The terminal may require high-speed or high-capacity communication according to the traffic. However, if a service is executed via a short-distance network such as the Bluetooth network, the high-speed or high-capacity communication cannot be supported or may not be smoothly performed. Therefore, handover to a network in which the high-speed or high-capacity communication can be supported is required to support communication according to the traffic.

In step 1120, the terminal compares current traffic and a predetermined threshold value. The terminal identifies the current traffic and, if the current traffic is greater than a predetermined threshold value, the terminal determines that the high-speed or high-capacity communication is required. Parameters for comparing the traffic include a Maximum Burst Size (MBS), a minimum PHYsical layer PHY rate, a peak data rate, a mean data rate, a delay bound, and the like.

If the current traffic is greater than the predetermined threshold value, the terminal exchanges information necessary for handover in step 1130. The information necessary for the handover refers to information on a network to which connectivity is handed over in addition to a currently connected network. The network to which connectivity is handed over may include Bluetooth, Wi-Fi, a GSM network, an EDGE network, a CDMA network, a W-CDMA network, an LTE network, an OFDMA network, and the like.

The terminal performs handover in step 1140. If the terminal determines that the traffic is greater than the predetermined threshold value, the terminal performs handover. If the handover is performed, the terminal disconnects from the existing network and connects to the host device via the network to which connectivity is handed over.

Figure 12:
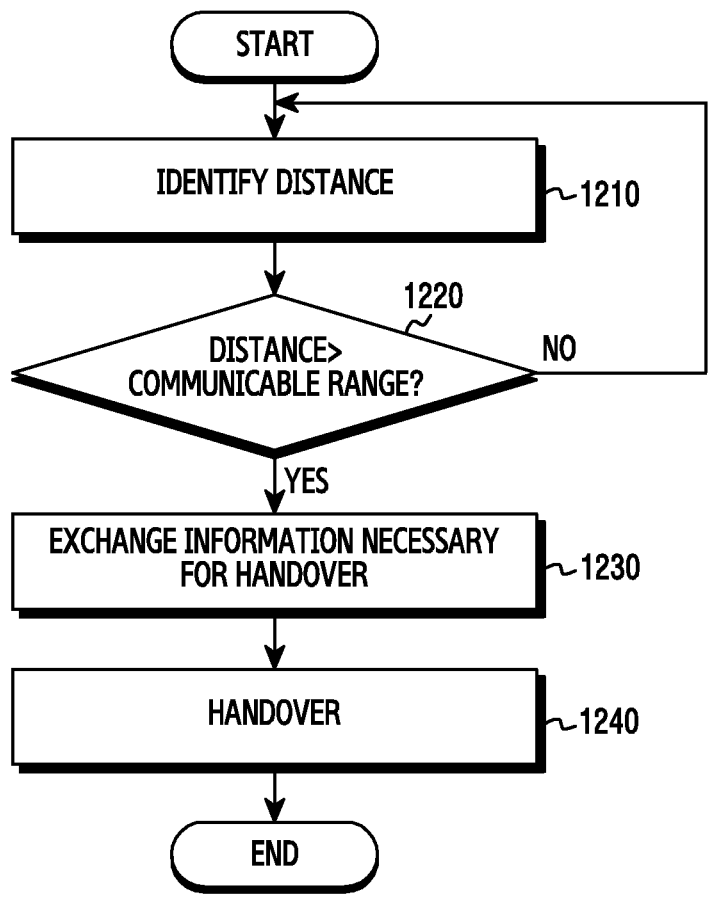
FIG. 12 is a flowchart of a handover method according to an identified distance according to an embodiment of the present invention.

FIG. 12 is a flowchart of a handover according to an identified distance according to an embodiment of the present invention.

Referring to FIG. 12, the terminal measures a distance to the host device in step 1210. If the distance to the host device exceeds a communicable range, the terminal disconnects from the host device. Therefore, the terminal may continue connecting to the host device by performing handover.

In step 1220, the terminal compares the measured distance and the communicable range. If the measured distance exceeds the communicable range, the terminal performs handover to continue connecting to the host device.

If the distance to the host device exceeds the communicable range, the terminal exchanges information necessary for handover in step 1230. The information necessary for the handover refers to information on a network to which connectivity is handed over in addition to a currently connected network.

The network to which connectivity is handed over may include Bluetooth, Wi-Fi, a GSM network, an EDGE network, a CDMA network, a W-CDMA network, an LTE network, an OFDMA network, and the like.

In step 1240, the terminal performs handover. If the distance to the host device exceeds the communicable range, the terminal performs handover. If the handover is performed, the terminal may disconnect from the existing network and connects to the host device via the network to which connectivity is handed over.

Figure 13:
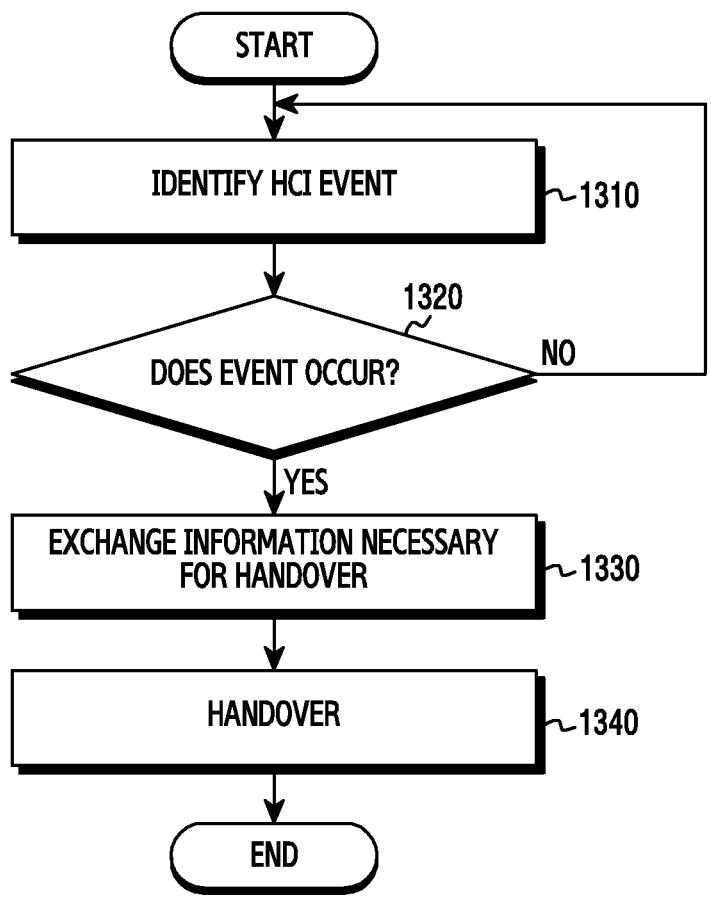
FIG. 13 is a flowchart of a handover method according to an identified HCI event according to an embodiment of the present invention.

FIG. 13 is a flowchart of a handover method according to an identified HCI event according to an embodiment of the present invention.

Referring to FIG. 13, the terminal identifies an HCI event in step 1310. If the terminal identifies the HCI event and disconnection between the terminal and the host device occurs, the terminal performs handover to connect to the host device.

In step 1320, the terminal determines whether a disconnection event occurs or not. If the disconnection event occurs, the terminal performs handover to continue to connect to the host device.

If the disconnection event occurs, the terminal exchanges information necessary for handover in step 1330. The information necessary for the handover refers to information on a network to which connectivity is handed over in addition to a currently connected network. The network to which connectivity is handed over may include Bluetooth, Wi-Fi, a GSM network, an EDGE network, a CDMA network, a W-CDMA network, an LTE network, an OFDMA network, and the like.

In step 1340, the terminal performs handover. If the disconnection event occurs, the terminal performs handover. If the handover is performed, the terminal disconnects from the existing network and connects to the host device via the network to which connectivity is handed over.

Figure 14:
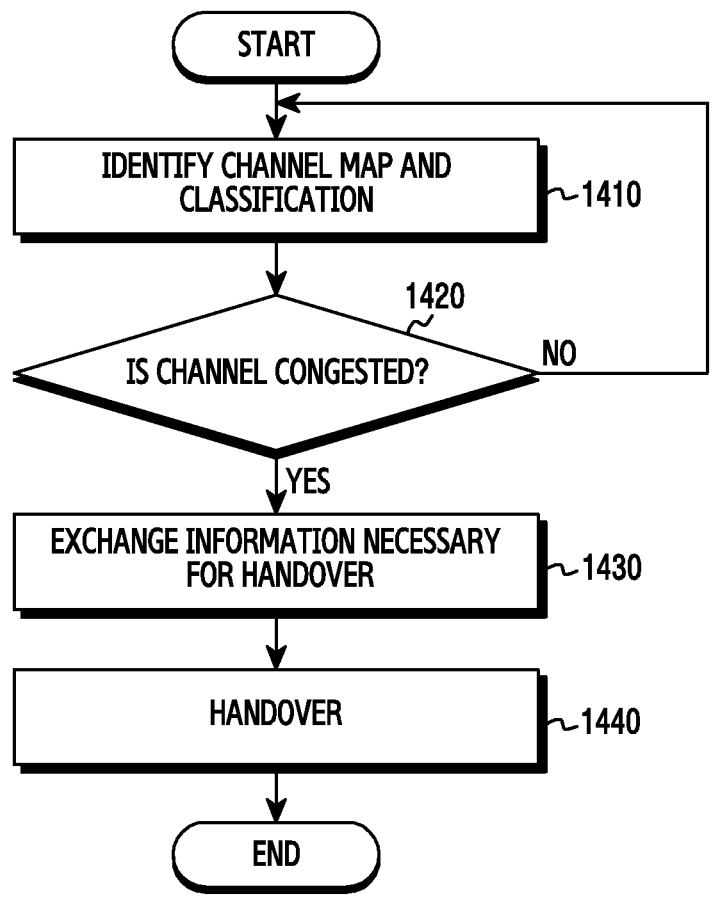
FIG. 14 is a flowchart of a handover method according to an identified channel map classification according to an embodiment of the present invention.

FIG. 14 is a flowchart of a handover method according to an identified channel map classification according to an embodiment of the present invention.

Referring to FIG. 14, the terminal identifies a channel map and a channel classification in step 1410. If the channel map and the channel classification are identified and a connection channel between the terminal and the host device is congested, the terminal performs handover to connect to the host device.

In step 1420, the terminal determines whether a disconnection event occurs or not. If the disconnection event occurs, the terminal performs handover to continue to connect to the host device.

If the channel is congested, the terminal exchanges information necessary for handover in step 1430. The information necessary for the handover refers to information on a network to which connectivity is handed over in addition to a currently connected network. The network to which connectivity is handed over may include Bluetooth, Wi-Fi, a GSM network, an EDGE network, a CDMA network, a W-CDMA network, an LTE network, an OFDMA network, and the like.

The terminal performs handover in step 1440. If the channel is congested, the terminal performs handover. If the handover is performed, the terminal disconnects from the existing network and connects to the host device via the network to which connectivity is handed over.

Figure 15:
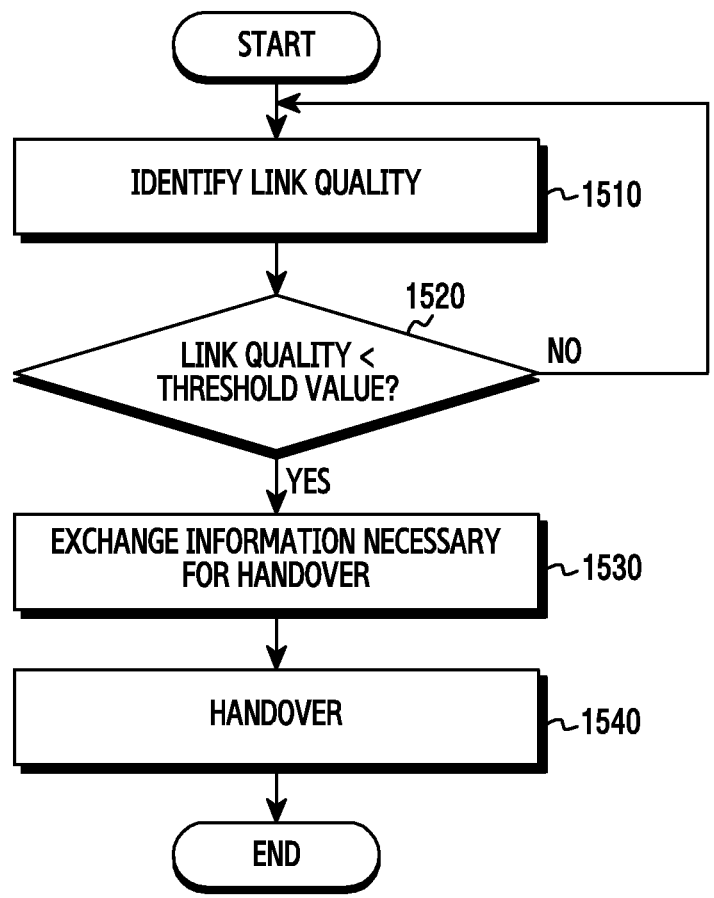
FIG. 15 is a flowchart of a handover method according to identified link quality according to an embodiment of the present invention.

FIG. 15 is a flowchart of a handover method according to identified link quality according to an embodiment of the present invention.

Referring to FIG. 15, the terminal identifies link quality in step 1510. if the quality of the link between the terminal and the host device is identified, as compared to a predetermined reference, and is less than a predetermined reference, the terminal performs handover to connect to the host device.

In step 1520, the terminal compares the quality of the link to a threshold value. If the current quality of connection link between the terminal and the host device is identified, as compared to a threshold value of a predetermined reference quality, and is less than the predetermined reference quality, the terminal performs handover to improve connectivity.

If the quality of the link is low, the terminal exchanges information necessary for handover in step 1530. The information necessary for the handover refers to information on a network to which connectivity is handed over in addition to a currently connected network. The network to which connectivity is handed over may include Bluetooth, Wi-Fi, a GSM network, an EDGE network, a CDMA network, a W-CDMA network, an LTE network, an OFDMA network, and the like.

The terminal performs handover in step 1540. If the link quality is low, the terminal performs handover. If the handover is performed, the terminal disconnects from the existing network and connects to the host device via the network to which connectivity is handed over.

Figure 16:
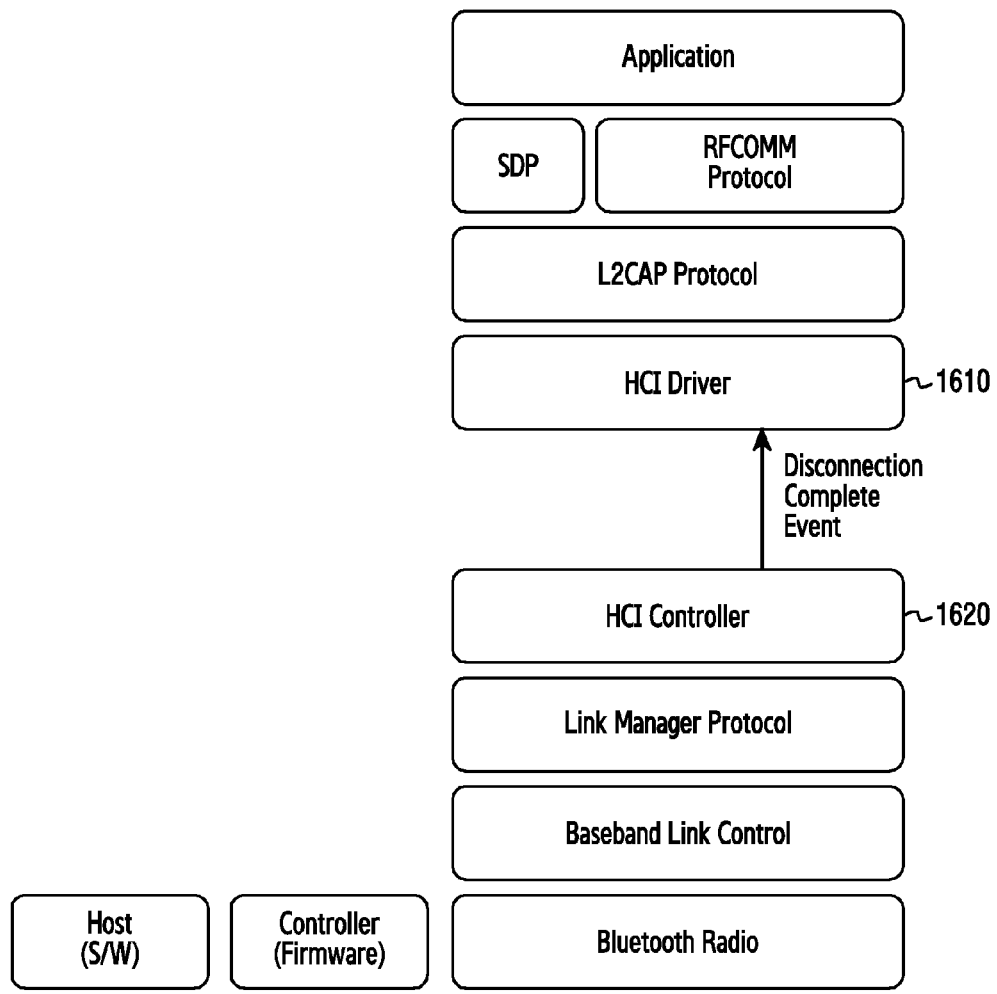
FIG. 16 illustrates an event in which disconnection occurs using an HCI according to an embodiment of the present invention.

FIG. 16 illustrates a view showing an example of an event in which disconnection occurs using an HCI according to an embodiment of the present invention.

Referring to FIG. 16, a disconnection event occurs due to a link loss. The link loss is identified if a controller does not receive a packet longer than link supervision timeout, and the disconnection event occurs as a connection timeout (e.g. 0x08) parameter is transmitted. The specification of BT core v4.0 is described in Table 4 presented below, and the reason for the event is described in Table 5 presented below:

TABLE 4

| Event | Event Code | Event Parameters |
|---|---|---|
| Disconnection Complete | 0x05 | Status, Connection_Handle Reason |

TABLE 5

| Value | Parameter Description |
|---|---|
| 0xXX | Reason for disconnection. See Part D, Error Codes on page 339 for error codes and descriptions. |

Figure 17:
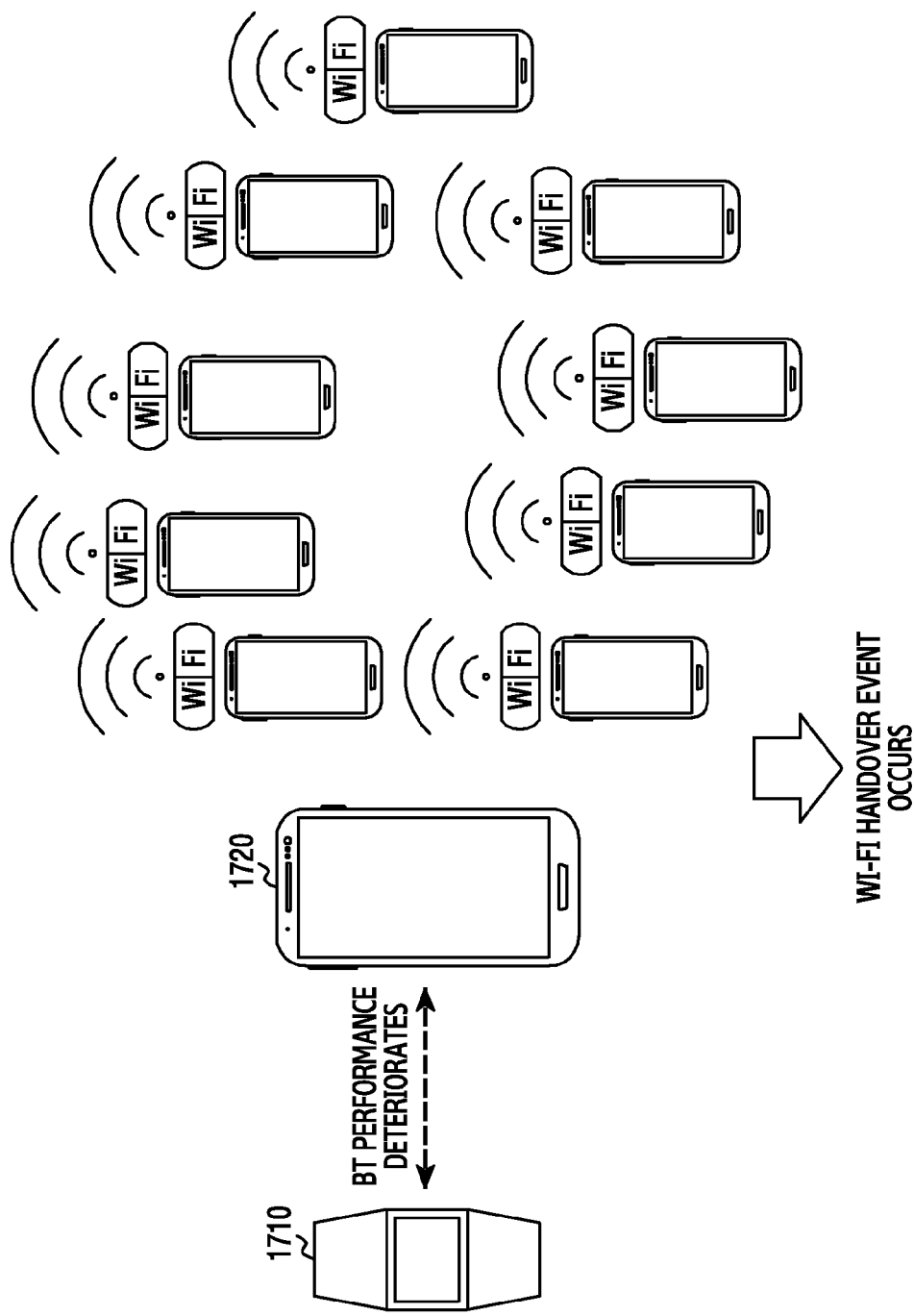
FIG. 17 illustrates a handover event which occurs in a dense Wi-Fi traffic area according to an embodiment of the present invention.

FIG. 17 illustrates a view showing an example of a handover event which occurs in a dense Wi-Fi traffic area according to an embodiment of the present invention.

Referring to FIG. 17, a terminal 1710 and a host device 1720 are affected by interference by a plurality of Wi-Fi signals in a Wi-Fi device dense environment. Due to the interference, performance of a short-distance communication network such as Bluetooth may deteriorate. To overcome the deterioration in the performance of the short-distance communication network caused by the interference, the terminal 1710 or the host device perform hand over connectivity from the short-distance communication network such as Bluetooth to a Wi-Fi network, connects to the Wi-Fi network, and terminates connection to the short-distance communication network.

Figure 18:
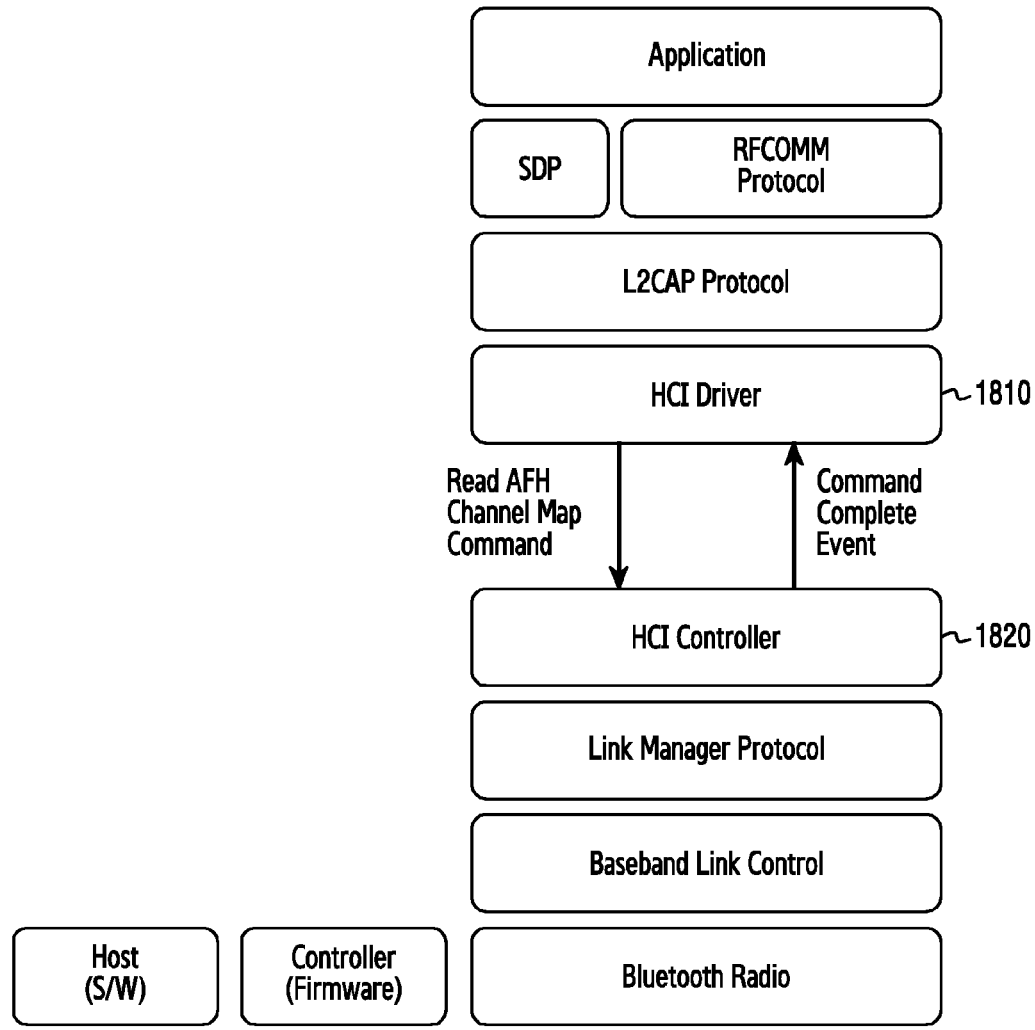
FIG. 18 illustrates an event which occurs according to an Adaptive Frequency Hopping (AFH) channel map command according to an embodiment of the present invention.

FIG. 18 illustrates a view showing an example of an event which occurs according to an AFH channel map command according to an embodiment of the present invention.

Referring to FIG. 18, the terminal may use a read AFH channel map command to identify the AFH channel map. The terminal may identify current AFH channel map information based on the read AFH channel map command. The AFH channel map command is described in Table 6 presented below, and AFH_Channel_Map is described in Table 7 presented below.

TABLE 6

| Command | OCF | Command Parameters | Return Parameters |
|---|---|---|---|
| HCI_Read_AFH_Channel_Map | 0x0006 | Connection_Handle | Status, Connection_Handle, AFH_Mode, AFH_Channel_Map |

TABLE 7

| Value | Parameter Description |
|---|---|
| 0xXXXXXXXXXXXXXXXXXXXX | If AFH_Mode is AFh enabled then this parameter contains 79 1-bit fields, otherwise the contents are reserved. The N$^{th}$ such field (in the range 0 to 78) contains the value for channel n: Channel n is unused = 0 Channel n is unsed = 1 Range: 0x00000000000000000000-0x7FFFFFFFFFFFFFFFFFFF (0x80000000000000000000-0xFFFFFFFFFFFFFFFFFFFF Reserved for future use) |

As a command to identify a channel classification, a command to enable and disable (e.g. on and off) a channel classification function using local information through a write AFH channel assessment mode command, or a set AFH host channel classification command to set 0 if the channel classification is unsatisfactory in the host device and set 1 if the channel classification is unknown may be used.

Figure 19:
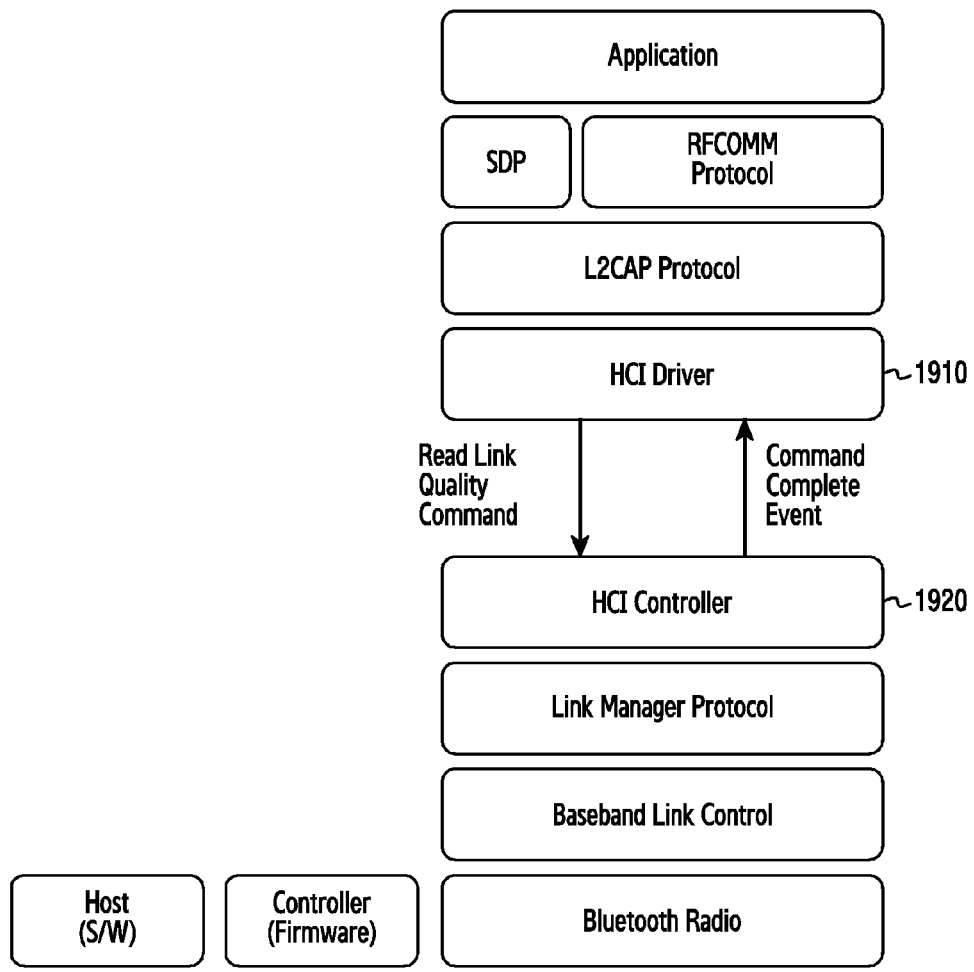
FIG. 19 illustrates a process for identifying quality on current link connection according to an embodiment of the present invention.

FIG. 19 illustrates a view showing an example of a process for identifying quality on current link connection according to an embodiment of the present invention.

Referring to FIG. 19, the terminal may identify quality on current link connection using an HCI command. The terminal may identify the quality of the link using an HCI command which is periodically seen. If a read link quality command is inputted to an HCI controller, a Link_Quality parameter is included in a command complete event and is transmitted from the HCI controller to an HCI driver. The Link_Quality informs the quality of the current link and the quality of the link is determined based on 0x00 to 0xFF values received. That is, the higher the received value, the higher the quality of the link. The specification on the link quality is described in Table 8 presented below, and Link_Quality is described in Table 9 presented below:

TABLE 8

| Command | OCF | Command Parameters | Return Parameters |
|---|---|---|---|
| HCI_Read_Link_Quality | 0x0003 | Handle | Status, Handle, Link_Quality |

TABLE 9

| Value | Parameter Description |
|---|---|
| 0xXXX | The current quality of the Link connection between the local device and the remote device specified by the Handle. Range: 0x00-0xFF The higher the value, the better the link quality is. |

Figure 20:
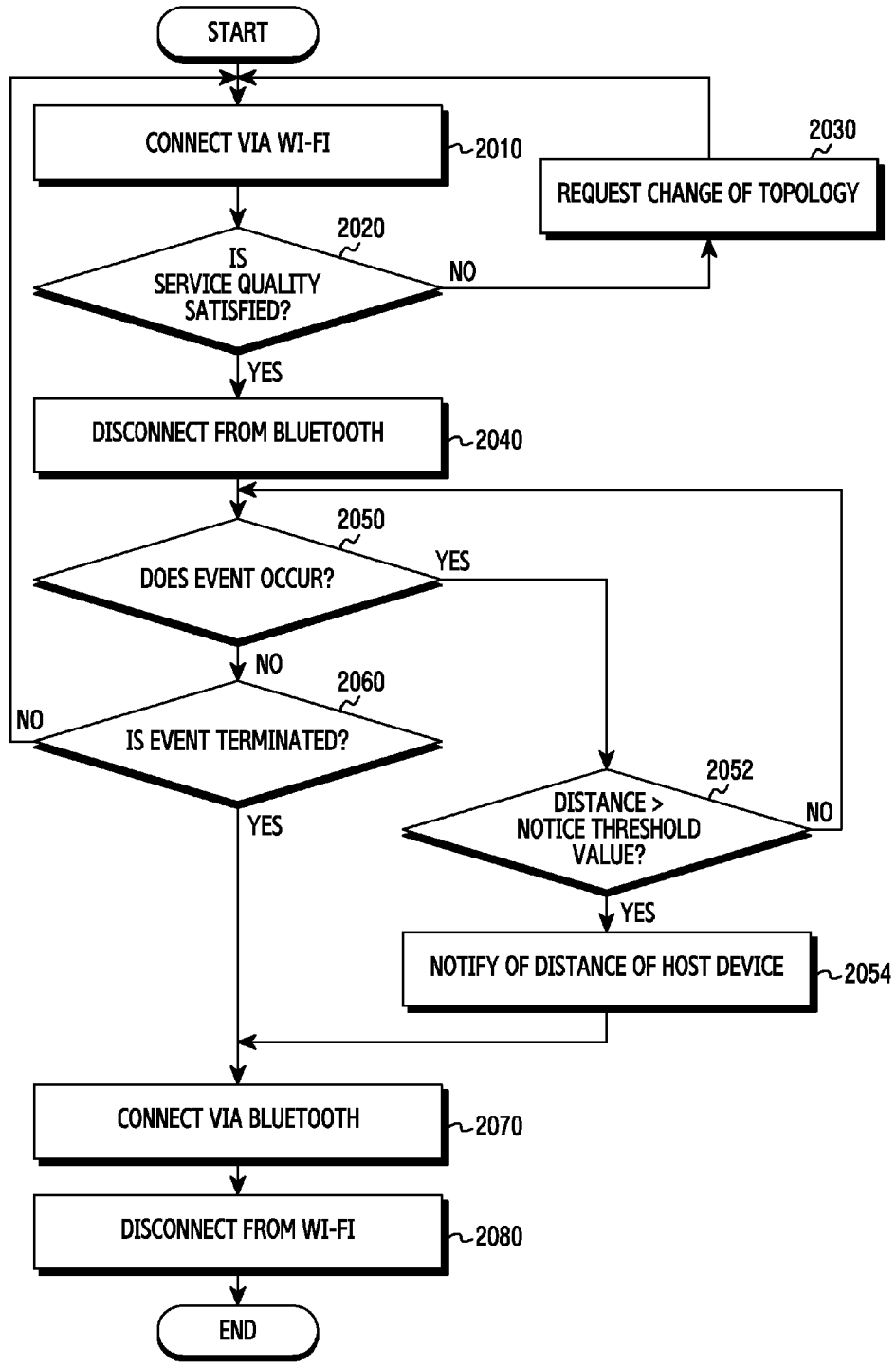
FIG. 20 is a flowchart of a Wi-Fi handover method according to an embodiment of the present invention.

FIG. 20 is a flowchart of a Wi-Fi handover method according to an embodiment of the present invention.

Referring to FIG. 20, the terminal connects to a Wi-Fi network in step 2010. The terminal identifies the quality of a service in step 2020. The quality of the service may be identified by measuring a quality value through the HCI command and then comparing the measured quality value and a predetermined threshold value. If the quality of the service is less than the threshold value, the terminal requests a change of topology to connect to a Wi-Fi network of an improved quality in step 2030. By changing the topology, the terminal connects to the Wi-Fi network in a different way from the existing connection to the Wi-Fi network and thus tries for a connection of improved quality.

In step 2040, the terminal disconnects from Bluetooth since the terminal connects to the Wi-Fi network. In step 2050, the terminal determines whether an event occurs or not, and, if the event occurs, the terminal measures a distance in step 2052. If the measured distance is greater than a notice threshold value, the terminal proceeds to step 2054 to notify of a disconnection as the terminal moves further away from the host device. If the event is terminated in step 2060, the terminal connects to the Bluetooth network again in step 2070, and disconnects from the Wi-Fi network in step 2080. In the above-described example, the disconnection is notified if the terminal moves away from the host device. However, the disconnection may be notified if other events, such as a change in a transfer queue, a packet staying time, a moving pattern, a currently executed service, traffic, an HCI event, link quality, and the like, occur before handover is performed.

Figure 21:
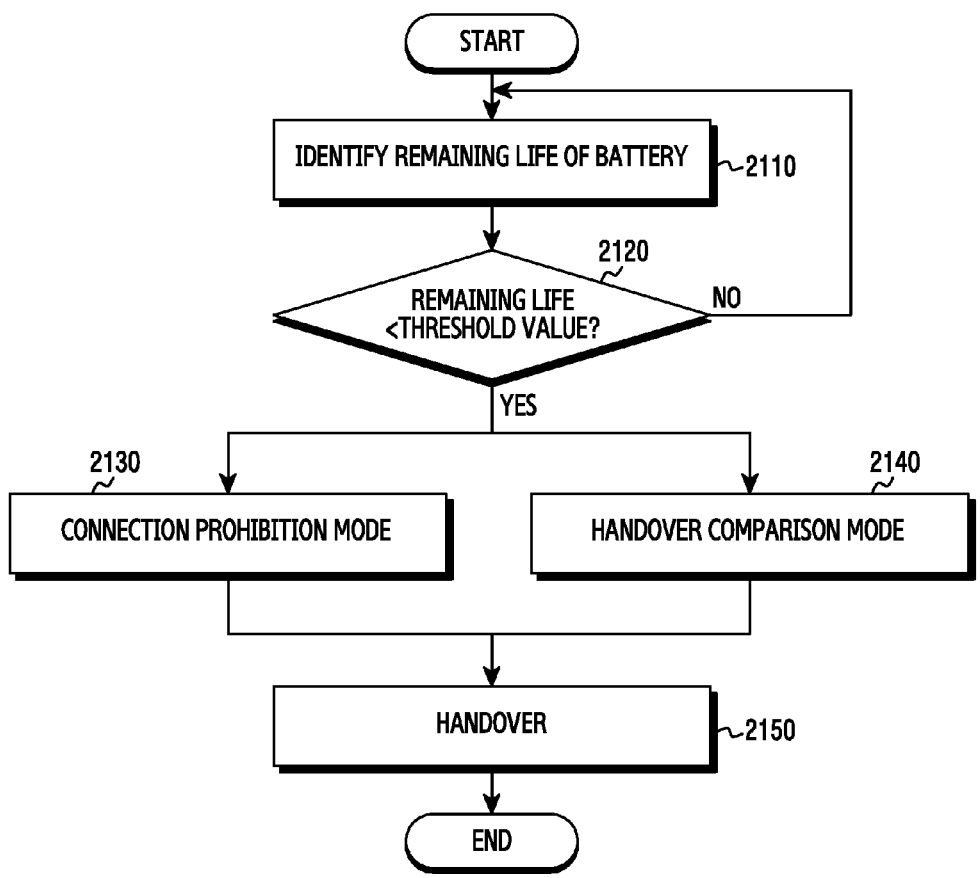
FIG. 21 is a flowchart of a method of controlling handover from Bluetooth to Wi-Fi according to an amount of power according to an embodiment of the present invention.

FIG. 21 is a flowchart of a method of controlling handover from Bluetooth to Wi-Fi according to an amount of power according to an embodiment of the present invention.

Referring to FIG. 21, the terminal identifies a remaining life of a battery in step 2110, and compares the remaining life of the battery and a predetermined threshold value in step 2120. If the remaining life of the battery is less than the threshold value, the terminal proceeds to step 2130 to set a connection prohibition mode or proceeds to step 2140 to set a handover comparison mode to compare power consumption if the service is provided through Bluetooth and if the service is provided through Wi-Fi and perform handover only if a gain is achieved. In an embodiment of the present invention, handover is applied to Bluetooth and Wi-Fi, but the connection prohibition mode and the handover comparison mode may be applied to other networks.

Figure 22:
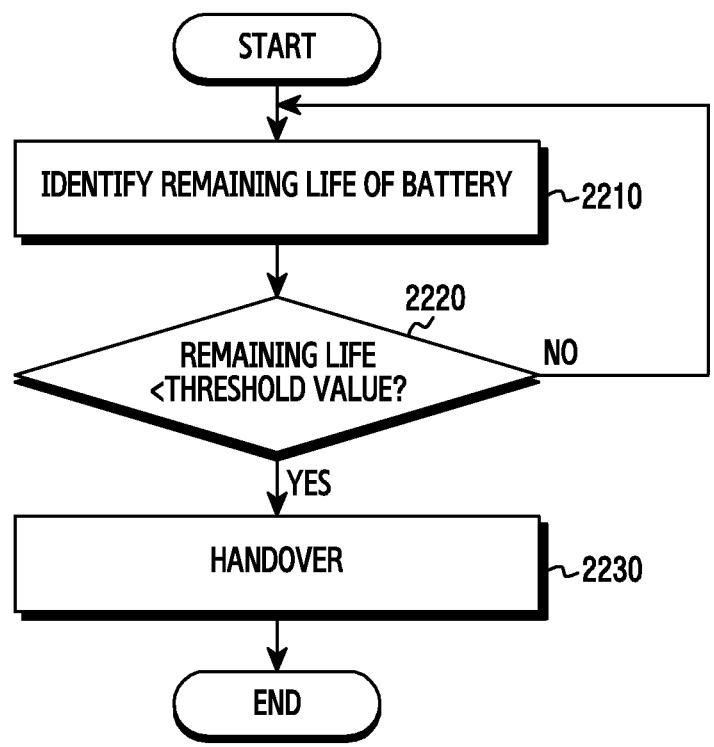
FIG. 22 is a flowchart of a method of controlling handover from Wi-Fi to Bluetooth according to an amount of power according to an embodiment of the present invention.

FIG. 22 is a flowchart of a method of controlling handover from Wi-Fi to Bluetooth according to an amount of power according to an embodiment.

Referring to FIG. 22, the terminal identifies a remaining life of a battery in step 2210, and compares the remaining life of the battery and a predetermined threshold value in step 2220. If the remaining life of the battery is less than the threshold value, the terminal performs handover from Wi-Fi to Bluetooth to reduce power consumption in the battery in step 2230.

Figure 23:
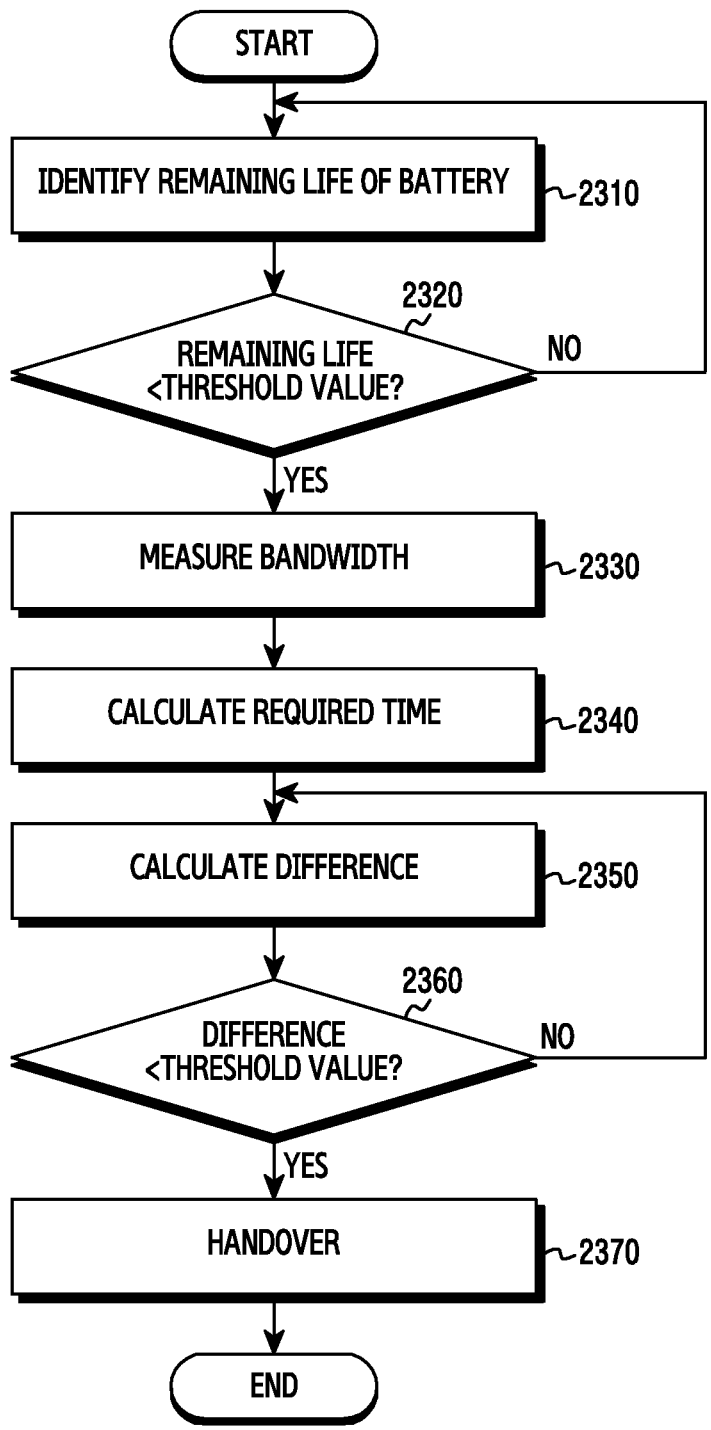
FIG. 23 is a flowchart of a method of controlling handover according to a power-saving mode according to an embodiment of the present invention.

FIG. 23 is a flowchart of a method of controlling handover from Wi-Fi to Bluetooth according to an estimated time required to provide a service according to an embodiment of the present invention.

Referring to FIG. 23, the terminal identifies a remaining life of a battery in step 2310, and compares the remaining life of the battery and a predetermined threshold value in step 2320. If the remaining life of the battery is less than the threshold value, the terminal measures a bandwidth of Wi-Fi and measures an estimated bandwidth of Bluetooth in step 2330. In step 2340, the terminal calculates a time required to provide a service using the measured bandwidth of Wi-Fi and a time required to provide the service using the estimated bandwidth of Bluetooth. In step 2350, the terminal calculates a difference between the time required to provide the service using the measured bandwidth of Wi-Fi and the time required to provide the service using the estimated bandwidth of Bluetooth. If the difference between the required times is less than a predetermined threshold value in step 2360, the terminal performs handover from Wi-Fi to Bluetooth.

Figure 24:
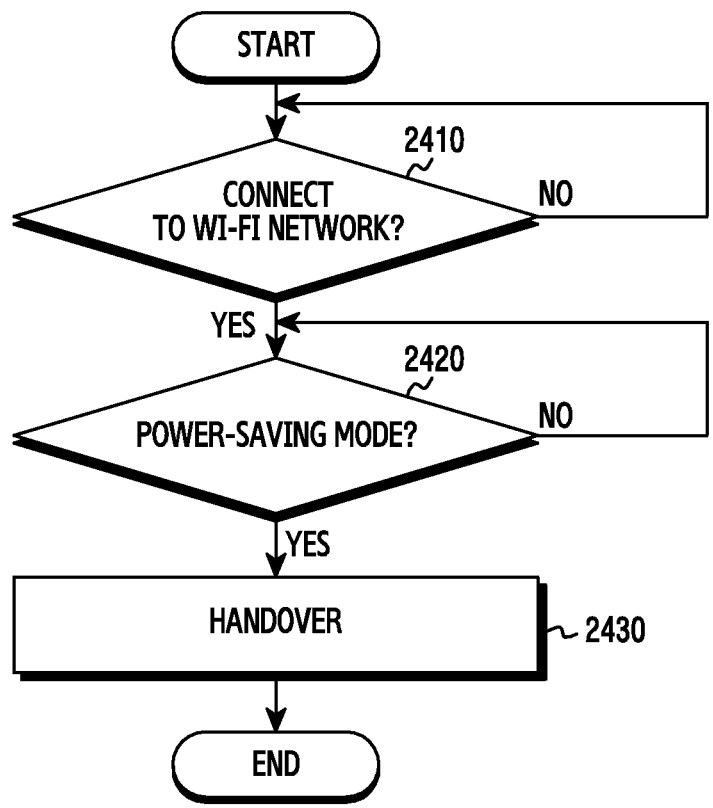
FIG. 24 is a flowchart of a method of controlling handover according to a power-saving mode according to an embodiment of the present invention.

FIG. 24 is a flowchart of a method of controlling handover according to a power-saving mode according to an embodiment of the present invention.

Referring to FIG. 24, the terminal determines whether the terminal connects to Wi-Fi in step 2410. If the terminal connects to Wi-Fi, the terminal determines whether the terminal is in a power-saving mode or not in step 2420. If the terminal is in the power-saving mode, the terminal performs handover from Wi-Fi to Bluetooth to reduce power consumption of the battery in step 2430.

Figure 25:
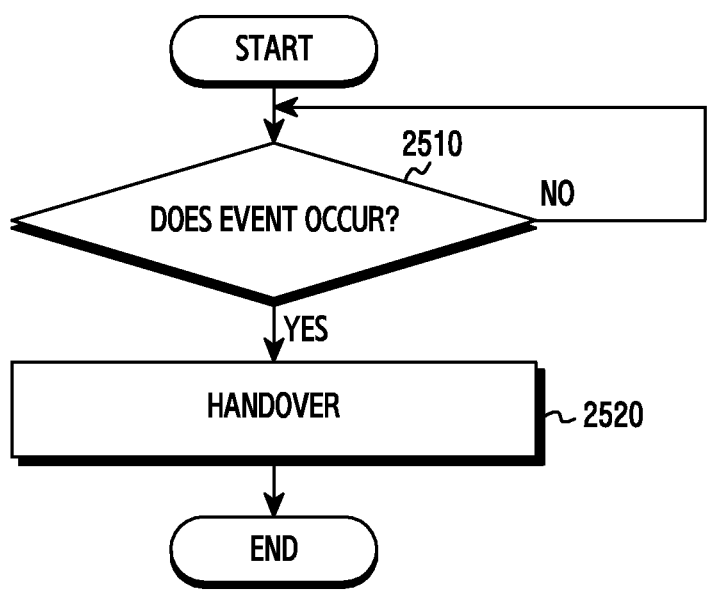
FIG. 25 is a flowchart of a handover method according to an embodiment of the present invention.

FIG. 25 is a flowchart of a handover method according to an embodiment of the present invention.

Referring to FIG. 25, the terminal identifies an event of the terminal in step 2510. The event includes identifying the amount of used transfer queues, a packet holding time, a moving pattern, a current service, traffic, a distance, a link loss, a channel map and a channel classification, and link quality. The terminal identifies the event and compares the event and a predetermined reference, and, if it is determined that handover is needed, the terminal performs handover in step 2520.

Figure 26:
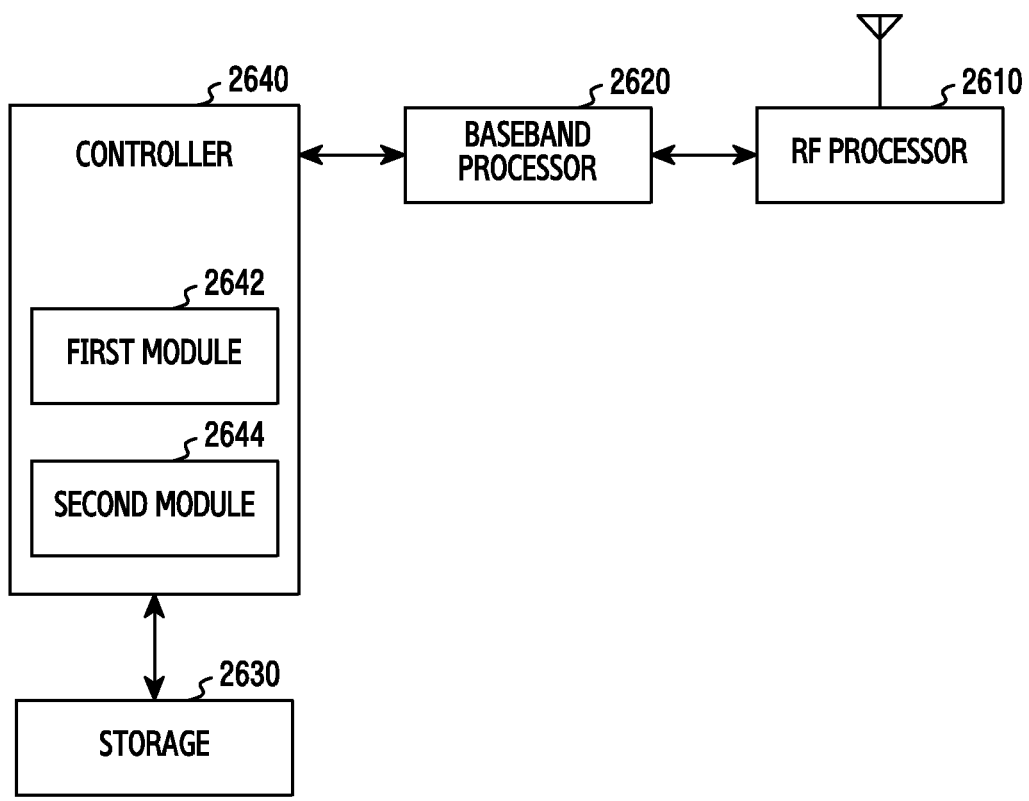
FIG. 26 is a block diagram of a handover device according to an embodiment of the present invention.

FIG. 26 is a block diagram of a handover device according to an embodiment of the present invention.

Referring to FIG. 26, the device includes a Radio Frequency (RF) processor 2610, a base band processor 2620, storage 2630, and a controller 2640.

The RF processor 2610 performs a function for transmitting and receiving signals via a wireless channel, such as signal band conversion, amplification, and the like. That is, the RF processor 2610 up-converts a baseband signal provided from the baseband processor 2620 into an RF band signal, transmits the RF band signal via an antenna, and down-converts an RF band signal received via the antenna into a baseband signal. In FIG. 26, a single antenna is illustrated but the transmitting end may include a plurality of antennas.

The baseband processor 2620 converts between a baseband signal and a bit string according to a physical layer standard of a system. For example, if transmitting data, the baseband processor 2620 generates complex symbols by encoding and modulating transmission bit strings. In addition, if receiving data, the baseband processor 2620 restores reception bit strings by demodulating and decoding baseband signals provided from the RF processor 2610. For example, according to the Orthogonal Frequency Division Multiplexing (OFDM) method if transmitting data, the baseband processor 2620 generates complex symbols by encoding and modulating transmission bit strings, maps the complex symbols onto sub carriers, and then configures OFDM symbols by performing an Inverse Fast Fourier Transform (IFFT) operation and inserting a Cyclic Prefix (CP). In addition, if receiving data, the baseband processor 2620 divides the baseband signal provided from the RF processor 2610 on an OFDM symbol basis, restores the signals which have been mapped onto sub carriers through the Fast Fourier Transform (FFT) operation, and then restores reception bit strings by demodulating and decoding. The baseband processor 2620 and the RF processor 2610 transmit and receive the signals as described above. Accordingly, the baseband processor 2620 and the RF processor 2610 may be referred to as a transmitter, a receiver, a transceiver, or a communicator.

The storage 2630 stores data such as programs, application programs, and set information for operations of an apparatus for controlling a transfer rate. In particular, the storage 2630 may store information related to handover between a terminal and a host device. In addition, the storage 2630 may provide stored data according to a request of the controller 2640.

The controller 2640 includes a first module 2642 and a second module 2644, and controls overall operations of the apparatus for managing connection to a mobile base station. For example, the controller 2640 transmits signals via the baseband processor 2620 and the RF processor 2610, and connects to a base station. For example, the controller 2640 controls the handover device to perform the procedures shown in FIGS. 2, 4, 7, 10-15, and 20-25. According to an embodiment, the controller 2640 performs the operations described below.

The controller 2640 identifies an event of a terminal. The event includes identifying the amount of used transfer queues, a packet holding time, a moving pattern, a current service, traffic, a distance, a link loss, a channel map and a channel classification, and link quality. The controller 2640 identifies the event of the terminal and then compares the event and a predetermined reference, and if it is determined that handover is needed, the controller 2640 performs handover to another network.

Methods based on the embodiments disclosed in the appended claims and/or present disclosure of the present invention can be implemented in hardware, software, or a combination of both.

When implemented in software, a non-transitory computer readable recording medium for storing one or more programs (e.g. software modules) can be provided. The one or more programs stored in the non-transitory computer readable recording medium are configured for execution performed by one or more processors in an electronic device. The one or more programs include instructions for allowing the electronic device to execute the methods based on the embodiments of the present invention disclosed in the appended claims and/or the present disclosure of the present invention.

The program (e.g. the software module or software) can be stored in a Random Access Memory, a non-volatile memory including a flash memory, a Read Only Memory (ROM), an Electrically Erasable Programmable Read Only Memory (EEPROM), a magnetic disc storage device, a Compact Disc-ROM (CD-ROM), a Digital Versatile Disc (DVD) or other forms of optical storage devices, and a magnetic cassette. Alternatively, the program can be stored in a memory configured in a combination of all or some of these storage media. In addition, the configured memory may be plural in number.

Further, a program can be stored in an attachable storage device capable of accessing an electronic device through a communication network such as the Internet, an Intranet, a Local Area Network (LAN), a Wireless LAN (WLAN), a Storage Area Network (SAN), or a communication network configured by combining the networks. The storage device can be accessed via an external port to the electronic device performing the embodiments of the present invention. In addition, a separate storage device on a communication network may access the apparatus performing an embodiment of the present invention.

In the above-described embodiments of the present invention, the elements included in the present invention are expressed in a singular form or a plural form according to an embodiment of the present invention. However, the singular form or plural form is only used to correspond to a situation suggested for convenience of explanation, the present invention is not limited to a single element or a plurality of elements, and the elements expressed in a plural form may be configured as a single element or an element expressed in a singular form may be configured as plural elements.

While the present invention has been shown and described with reference to various embodiments thereof, it will be understood by those skilled in the art that various changes in form and details may be made therein without departing from the scope and spirit of the present invention as defined by the appended claims and their equivalents. Therefore, the scope of the invention is defined not by the detailed description of the present invention but by the appended claims and their equivalents, and all differences within the scope of the present invention should be construed as being included within the scope of the present invention.

What is claimed is:

1. An electronic device for performing wireless communication, the electronic device comprising:
   a controller configured to:
   communicate with another electronic device via a first direct link between the electronic device and the another electronic device,
   determine that an amount of packet data to be transmitted via the first direct link is more than a threshold amount in a transmission queue, and
   a time difference between a first time a packet is entered in the transmission queue and a second time the packet is processed from the transmission queue; and
   if the amount of the packet data more than the threshold amount is maintained in the transmission queue longer than a first threshold time, and
   the time difference is larger than a second threshold time, communicate with the another electronic device via a second direct link between the electronic device and the another electronic device to transmit the packet data through the second direct link,
   wherein the second direct link is established before the first direct link is released,
   wherein the second direct link requires less power than the first direct link, and
   wherein the second direct link is established if a remaining amount of a battery of the electronic device is below a preset value.

2. The electronic device of claim 1, wherein the second direct link is established if a moving pattern is identified and the moving pattern indicates that the electronic device moves away from the another electronic device.

3. The electronic device of claim 1, wherein the second direct link is established if a currently executed service is identified and it is determined that the service is subject to management.

4. The electronic device of claim 1, wherein the second direct link is established if current traffic exceeds a predetermined value.

5. The electronic device of claim 1, wherein the second direct link is established if a distance to the electronic device exceeds a predetermined value.

6. The electronic device of claim 1, wherein the second direct link is established if link loss is identified.

7. The electronic device of claim 1, wherein the second link is established if a channel map and a channel classification are identified and the channel is congested.

8. The electronic device of claim 1, wherein the second direct link is established if link quality is less than a predetermined value.

9. The electronic device of claim 1, wherein the second direct link is established if a received signal strength indicator (RSSI) for the first direct link is below a preset value.

10. The electronic device of claim 1, wherein the second direct link is established by a host controller interface (HCI) command.

11. The electronic device of claim 1, wherein the second direct link is established if an interference level for the first direct link affected by at least one interference signal exceeds a predetermine level.

12. A method of performing wireless communication in an electronic device, the method comprising:

communicating with another electronic device via a first direct link between the electronic device and the another electronic device;

determining that an amount of packet data to be transmitted via the first direct link is more than a threshold amount in a transmission queue, and a time difference between a first time a packet is entered in the transmission queue and a second time the packet is processed from the transmission queue; and if the amount of the packet data more than the threshold amount is maintained in the transmission queue longer than a first threshold time, and the time difference is larger than a second threshold time, communicating with the another electronic device via a second direct link between the electronic device and the another electronic device to transmit the packet data through the second direct link, wherein the second direct link is established before the first direct link is released, wherein the second direct link requires less power than the first direct link, and wherein the second direct link is established if a remaining amount of a battery of the electronic device is below a preset value.

13. The method of claim 12, wherein the second direct link is established if a moving pattern is identified and the moving pattern indicates that the electronic device moves away from the another electronic device.

14. The method of claim 12, wherein the second direct link is established if a currently executed service is identified and it is determined that the service is subject to management.

15. The method of claim 12, wherein the second direct link is established if current traffic exceeds a predetermined value.

16. The method of claim 12, wherein the second direct link is established if a distance to the another electronic device exceeds a predetermined value.

17. The method of claim 12, wherein the second direct link is established if link loss is identified.

18. The method of claim 12, wherein the second direct link is established if a channel map and a channel classification are identified and the channel is congested.

19. The method of claim 12, wherein the second direct link is established if link quality is less than a predetermined value.

20. The method of claim 12, wherein the second direct link is established if a received signal strength indicator (RSSI) for the first direct link is below a preset value.

21. The method of claim 12, wherein the second direct link is established by a host controller interface (HCI) command.

22. The method of claim 12, wherein the second direct link is established if an interference level for the first direct link affected by at least one interference signal exceeds a predetermine level.

* * * * *